United States Patent
Kim et al.

(10) Patent No.: US 9,816,817 B2
(45) Date of Patent: Nov. 14, 2017

(54) METHOD FOR ESTIMATING LOCATION OF USER TERMINAL USING DIFFERENCE BETWEEN TRUE NORTH AND MAGNETIC NORTH AND THE USER TERMINAL THEREOF

(71) Applicant: Samsung Electronics Co., Ltd., Suwon-si, Gyeonggi-do (KR)

(72) Inventors: Seong Eun Kim, Suwon-si (KR); Yong Kim, Seoul (KR); Eung Sun Kim, Suwon-si (KR); Hyun Gi Ahn, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 536 days.

(21) Appl. No.: 14/105,878

(22) Filed: Dec. 13, 2013

(65) Prior Publication Data
US 2014/0172356 A1  Jun. 19, 2014

(30) Foreign Application Priority Data
Dec. 13, 2012  (KR) .......... 10-2012-0145549

(51) Int. Cl.
| | | |
|---|---|---|
| G01C 9/00 | (2006.01) | |
| G01C 17/00 | (2006.01) | |
| G01C 7/00 | (2006.01) | |
| G01C 21/08 | (2006.01) | |

(52) U.S. Cl.
CPC .................. *G01C 21/08* (2013.01)

(58) Field of Classification Search
CPC ........ G01G 21/08; G01C 17/38; G01C 19/38; G01C 17/34; G01C 21/165; G01C 17/02; G01C 15/00; G01C 17/00; G01C 17/28; G01C 19/36; G01C 21/02; G01C 21/08; G01C 21/20; G01C 23/00; G01C 5/06; G01C 21/005

USPC ................... 702/150, 151, 6, 92, 93, 94, 95; 701/472, 1, 3, 505

See application file for complete search history.

(56) References Cited

U.S. PATENT DOCUMENTS

| | | | | |
|---|---|---|---|---|
| 6,166,686 | A * | 12/2000 | Lazar .................... | G01C 17/38 |
| | | | | 342/357.36 |
| 2008/0201096 | A1* | 8/2008 | Wright ................... | G01C 17/38 |
| | | | | 702/92 |
| 2012/0143495 | A1* | 6/2012 | Dantu .................. | G01C 21/206 |
| | | | | 701/428 |
| 2013/0150076 | A1 | 6/2013 | Kim et al. | |
| 2014/0180627 | A1* | 6/2014 | Naguib ................. | G01C 17/38 |
| | | | | 702/150 |

FOREIGN PATENT DOCUMENTS

| KR | 10-2013-0063821 A | 6/2013 |
|---|---|---|
| KR | 10-2013-0083176 A | 7/2013 |

* cited by examiner

*Primary Examiner* — Roy Y Yi
(74) *Attorney, Agent, or Firm* — Jefferson IP Law, LLP

(57) ABSTRACT

A method of estimating a location of a user terminal is provided. It is based on a difference between a true north and a magnetic north that may estimate a location of a user terminal on a magnetic field map based on a difference between a true north and a magnetic north corresponding to each location of the magnetic field map, and the user terminal thereof.

14 Claims, 7 Drawing Sheets

- - - ▶ Magnetic heading
———▶ Magnetic north at corresponding location

- - - ▶ Magnetic heading
———▶ Magnetic north at corresponding location
━━━▶ Compensated movement direction based on magnetic north at corresponding location

METHOD FOR ESTIMATING LOCATION OF USER TERMINAL USING DIFFERENCE BETWEEN TRUE NORTH AND MAGNETIC NORTH AND THE USER TERMINAL THEREOF

CROSS-REFERENCE TO RELATED APPLICATION(S)

This application claims the benefit under 35 U.S.C. §119 (a) of Korean patent application filed on Dec. 13, 2012 in the Korean Intellectual Property Office and assigned Serial number 10-2012-0145549, the entire disclosure of which is hereby incorporated by reference.

TECHNICAL FIELD

The present disclosure relates to a method of estimating a location of a user terminal based on a difference between a true north and a magnetic north.

BACKGROUND

A method of estimating a location using a magnetic field map may include, for example, a method of calculating a location of a terminal on a magnetic field map by measuring a magnetic field at the location of the terminal. An algorithm for estimating a location of a terminal through such calculation may include, for example, a Kalman filter algorithm, a particle filter algorithm, and a Markov localization algorithm. The above algorithms may measure environmental variables that vary variously according to a movement of a terminal, and may estimate a location of the terminal based on the measurement result.

A unique magnetic field map of a corresponding region or space may be generated in order to provide a measurement service. A magnetic field value may be measured at predetermined intervals using a magnetic field measurement device in order to generate the magnetic field map. Due to reinforced and steel frame structures within a building, distortion may occur and thus, a magnetic north may vary based on a location.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of estimating a location of a user terminal. The method includes storing a difference between a true north and a magnetic north corresponding to each location of a magnetic field map, and estimating the location of the user terminal on the magnetic field map based on the difference between the true north and the magnetic north.

In accordance with an aspect of the present disclosure, a method of estimating is provided. The method includes resetting a movement direction of each of a plurality of particles of a particle filter based on the difference between the true north and the magnetic north at a corresponding location of the magnetic field map, moving each of the plurality of particles in the reset movement direction, and estimating the location of the user terminal based on a direction in which each of the plurality of particles is moved.

In accordance with an aspect of the present disclosure, a method of estimating is provided. The method includes calculating a magnetic heading indicating a direction in which the user terminal is moved based on the magnetic north; compensating for the magnetic heading based on the difference between the true north and the magnetic north corresponding to each location of the magnetic field map, and estimating the location of the user terminal on the magnetic field map based on the compensated magnetic heading.

The calculating may include measuring a magnetic field value at the location of the user terminal, and calculating the magnetic heading based on the magnetic field value.

The compensating may include compensating for the magnetic heading based on the difference between the true north and the magnetic north corresponding to a location of each of a plurality of particles of a particle filter on the magnetic field map.

The estimating may include calculating a movement direction of each of the plurality of particles based on the compensated magnetic heading, and estimating the location of the user terminal based on the calculated movement direction of each of the plurality of particles.

The estimating may further include estimating the location of the user terminal based on a weight assigned to the calculated movement direction of each of the plurality of particles.

The foregoing and/or other aspects are achieved by providing a user terminal, including a database configured to store a difference between a true north and a magnetic north corresponding to each location of a magnetic field map, and a processor configured to estimate the location of the user terminal on the magnetic field map based on the difference between the true north and the magnetic north.

The processor may include a resetting unit configured to reset a movement direction of each of a plurality of particles of a particle filter based on the difference between the true north and the magnetic north at a corresponding location of the magnetic field map, a moving unit configured to move each of the plurality of particles in the reset movement direction, and an estimator configured to estimate the location of the user terminal based on a direction in which each of the plurality of particles is moved.

The processor may include a calculator configured to calculate a magnetic heading indicating a direction in which the user terminal is moved based on the magnetic north, a compensator configured to compensate for the magnetic heading based on the difference between the true north and the magnetic north corresponding to each location of the magnetic field map, and an estimator configured to estimate the location of the user terminal on the magnetic field map based on the compensated magnetic heading.

The calculator may measure a magnetic field value at the location of the user terminal, and to calculate the magnetic heading based on the magnetic field value.

The compensator may compensate for the magnetic heading based on the difference between the true north and the magnetic north corresponding to a location of each of a plurality of particles of a particle filter on the magnetic field map.

The estimator may calculate a movement direction of each of the plurality of particles based on the compensated magnetic heading, and to estimate the location of the user terminal based on the calculated movement direction of each of the plurality of particles.

The estimator may estimate the location of the user terminal based on a weight assigned to the calculated movement direction of each of the plurality of particles.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents It is to be understood that the singular forms "a," "an," and "the" include plural referents unless the context clearly dictates otherwise. Thus, for example, reference to "a component surface" includes reference to one or more of such surfaces.

Figure 1:
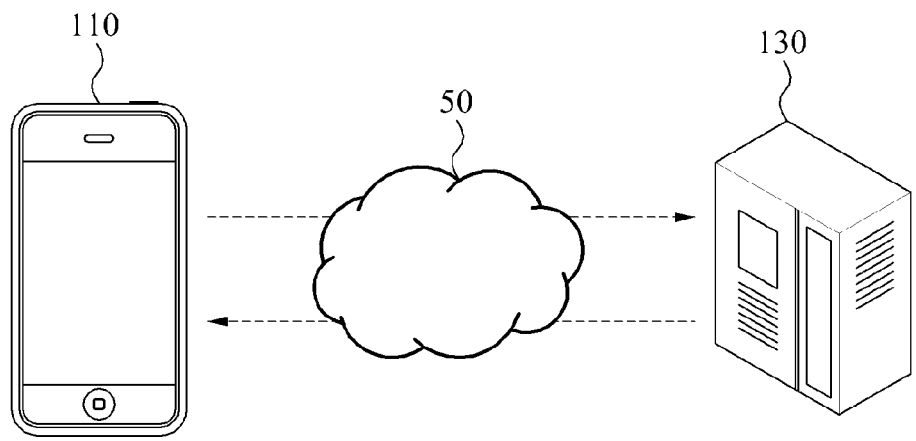
FIG. 1 is a diagram illustrating a system environment for performing a method of estimating a location of a user terminal according to an embodiment of the present disclosure.

FIG. 1 is a diagram illustrating a system environment for performing a method of estimating a location of a user terminal according to an embodiment of the present disclosure.

Referring to FIG. 1, the system environment may include a wired/wireless network 50, a user terminal 110, and a server 130. The user terminal 110 and the server 130 may exchange information over the wired/wireless network 50 according to an embodiment of the present disclosure.

The user terminal 110 may be a mobile phone, such as a smartphone, a blackberry, and a feature phone, for example, and a wireless or wired/wireless integrated terminal, such as a tablet PC, a pad, a Portable Multimedia Player (PMP), a Personal Digital Assistant (PDA), and a notebook, for example.

The user terminal 110 may include, for example, a magnetometer, and a magnetic field sensor or an Inertial Measurement Unit (IMU) sensor, and may measure a magnetic field value at a location of the user terminal 110. The user terminal 110 may include an application of estimating the location of the user terminal 110 and various location estimation algorithms, and may maintain sufficient processing power capable of executing a corresponding application or a location estimation algorithm.

The user terminal 110 may download the corresponding application from the server 130 over the wired/wireless network 50. Alternatively, applications provided through other paths may be installed in the user terminal 110. The user terminal 110 may directly store, in a memory, a map or a magnetic field map indicating a region in which the user terminal 110 may be located, or may be provided with the map or the magnetic field map through communication with the server 130.

Also, the user terminal 110 may receive information including a difference between a true north and a magnetic north corresponding to each location of the magnetic field map from the server 130 over the wired/wireless network 50, and may store the received information in a database.

Depending on various embodiments, the user terminal 110 may directly calculate the difference between the true north and the magnetic north corresponding to each location of the magnetic field map, and may store the calculated difference in the database.

The server 130 may refer to a wired, wireless, or wired/wireless integrated device, and may include a sufficient storage space capable of storing a magnetic field map of a region in which a service is provided to the user terminal 110. Accordingly, the server 130 may provide a map or a magnetic field map in response to a request of the user terminal 110, or may also correct a magnetic field map of a service region based on information including a magnetic field measurement value transmitted from the user terminal 110.

The magnetic field map may include magnetic field values measured in advance at a plurality of locations include within a predetermined range of a region, for example, a region in which a location of the user terminal 110 is to be estimated. In this example, the plurality of locations may be used to maintain a predetermined interval, and may include places in which magnetic field values may be measured or places which the user terminal 110 may reach.

In addition, each of the plurality of locations may refer to a location on a Three-Dimensional (3D) space instead of being a location on a Two-Dimensional (2D) plane. For example, the user terminal 110 may be used to estimate an indoor location, for example, a location within a multi-story building. Herein, it is assumed that a magnetic field is measured on each floor of the multi-story building and in this instance, a magnetic field is measured by fixing a location on each floor to have the same location based on a top view. In this case, even though locations on the respective floors appear to be identical on a 2D top view, altitudes of the respective locations may vary on the 3D space. Accordingly, a different magnetic field value may be measured on each floor.

Figure 2:
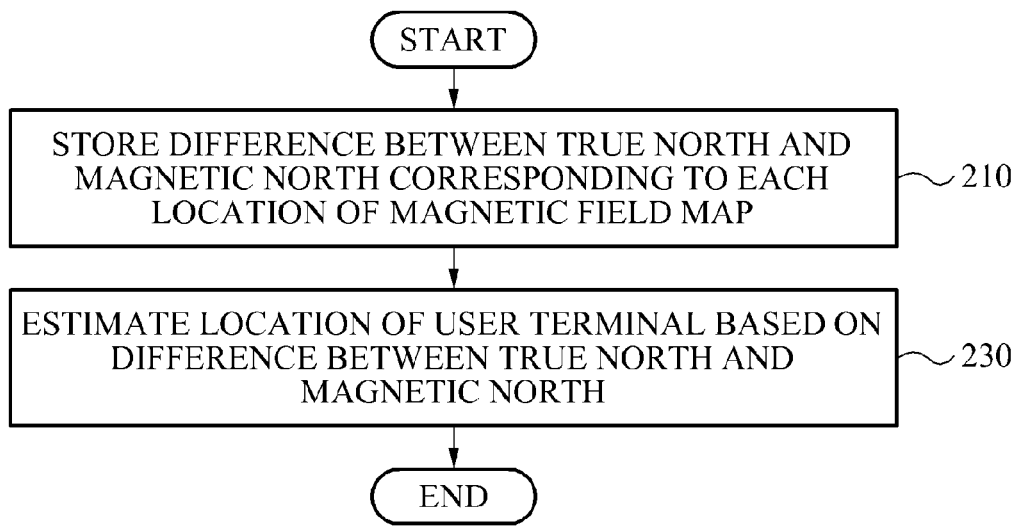
FIG. 2 is a flowchart illustrating a method of estimating a location of a user terminal according to an embodiment of the present disclosure.

FIG. 2 is a flowchart illustrating a method of estimating a location of a user terminal according to an embodiment of the present disclosure.

Referring to FIG. 2, in operation 210, the user terminal may store a difference between a true north and a magnetic north corresponding to each location of a magnetic field map. The difference between the true north and the magnetic north corresponding to each location of the magnetic field map may be calculated in advance and then transmitted using a server. The difference between the true north and the magnetic north in a corresponding region may be directly calculated by the user terminal.

An example of the difference between the true north and the magnetic north and an example of storing the difference between the true north and the magnetic north will be described with reference to FIG. 3.

In operation 230, the user terminal may calculate the location of the user terminal on the magnetic field map based on the difference between the true north and the magnetic north.

In operation 230, the user terminal may estimate the location of the user terminal based on a magnetic field value on the magnetic field map corresponding to the location of the user terminal and a magnetic heading compensated for based on the difference between the true north and the magnetic north. For example, as illustrated in FIG. 4, the user terminal may reset a movement direction of each of a plurality of particles based on a difference, for example, an error between the true north and the magnetic north corresponding to a magnetic field value (x, y, z) measured at a corresponding point as illustrated in FIG. 3.

Accordingly, the ambiguity in measurement occurring due to a distortion of a terrestrial magnetism may be overcome by decreasing the number of candidate regions in which the user terminal may be located on the magnetic field map.

Figure 3:
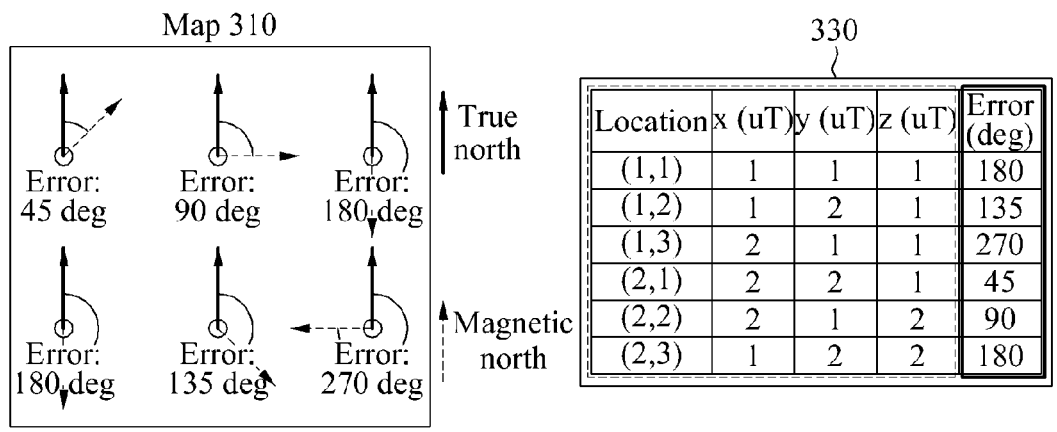
FIG. 3 illustrates a difference between a true north and a magnetic north occurring at each location of a magnetic field map and a table in which the difference between the true north and the magnetic north is stored according to an embodiment of the present disclosure.
Figure 4:
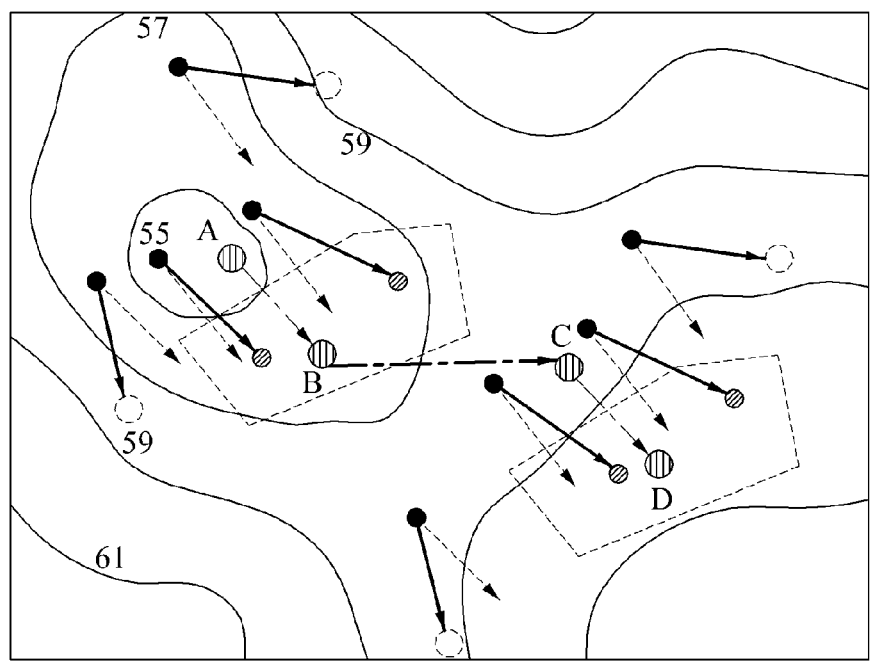
FIG. 4 illustrates an example of moving particles in an actual movement direction based on a difference between a true north and a magnetic north in a method of estimating a location of a user terminal according to an embodiment of the present disclosure.

FIG. 3 illustrates a difference between a true north and a magnetic north occurring at each location of a magnetic field map and a table in which the difference between the true north and the magnetic north is stored according to an embodiment of the present disclosure. FIG. 4 illustrates an example of moving a plurality of particles in an actual movement direction based on a difference between a true north and a magnetic north in a method of estimating a location of a user terminal according to an embodiment of the present disclosure.

As indicated by solid lines with arrowheads on a map 310 of FIG. 3, a true north of a building may be determined based on a geographical location of the building. However, due to reinforcement and steel frame structures, a distortion may occur in a magnetic field within the building and thus, the magnetic north that is the north pointed by electronic compasses may vary based on each location within the building as indicated by dotted lines with arrowheads. In general, the magnetic north of the electronic compasses may be used to set a progress direction for navigation.

For example, when the user terminal moves from a location A of FIG. 4 to a location B along a dotted line with an arrowhead, the magnetic north at the location A may become zero degrees and a movement direction may be determined based on the determined magnetic north. Here, a difference between the true north and the magnetic north is required to be accurately aware of an actual movement direction. To this end, the difference between the true north and the magnetic north, for example, a direction in which a magnetic field is measured, may be stored for each location as shown in a table 330.

Referring to FIG. 4, a candidate region found using a magnetic field value when the user is positioned at the location A may be marked using black points. The black points may be regarded as locations of a plurality of particles of a particle filter. According to a general measurement method, a movement direction of the user moving from the location A to the location B may be obtained based on the magnetic north and the user may move from a location C to a location D along a dotted line with an arrowhead, for example, a direction in which a location of each particle is the same.

According to an embodiment of the present disclosure, each of the plurality of particles may be moved in a direction marked using a solid line by resetting a movement direction of each of the plurality of particles based on a difference between the true north and the magnetic north at a corresponding location. In this example, only a solid line with an arrowhead toward a region in which a reset direction is marked using deviant crease lines may be regarded to point an actual candidate region among candidate regions marked using black points. Accordingly, it is possible to decrease confusion and ambiguity that may occur due to the same magnetic field value in a plurality of locations on the magnetic field map.

According to an embodiment of the present disclosure, a location of a user terminal may be more accurately estimated by resetting a movement direction of each of a plurality of particles based on a difference between a true north and a magnetic north at a corresponding location and by decreasing the number of candidate regions in which the user terminal may be located.

Figure 5:
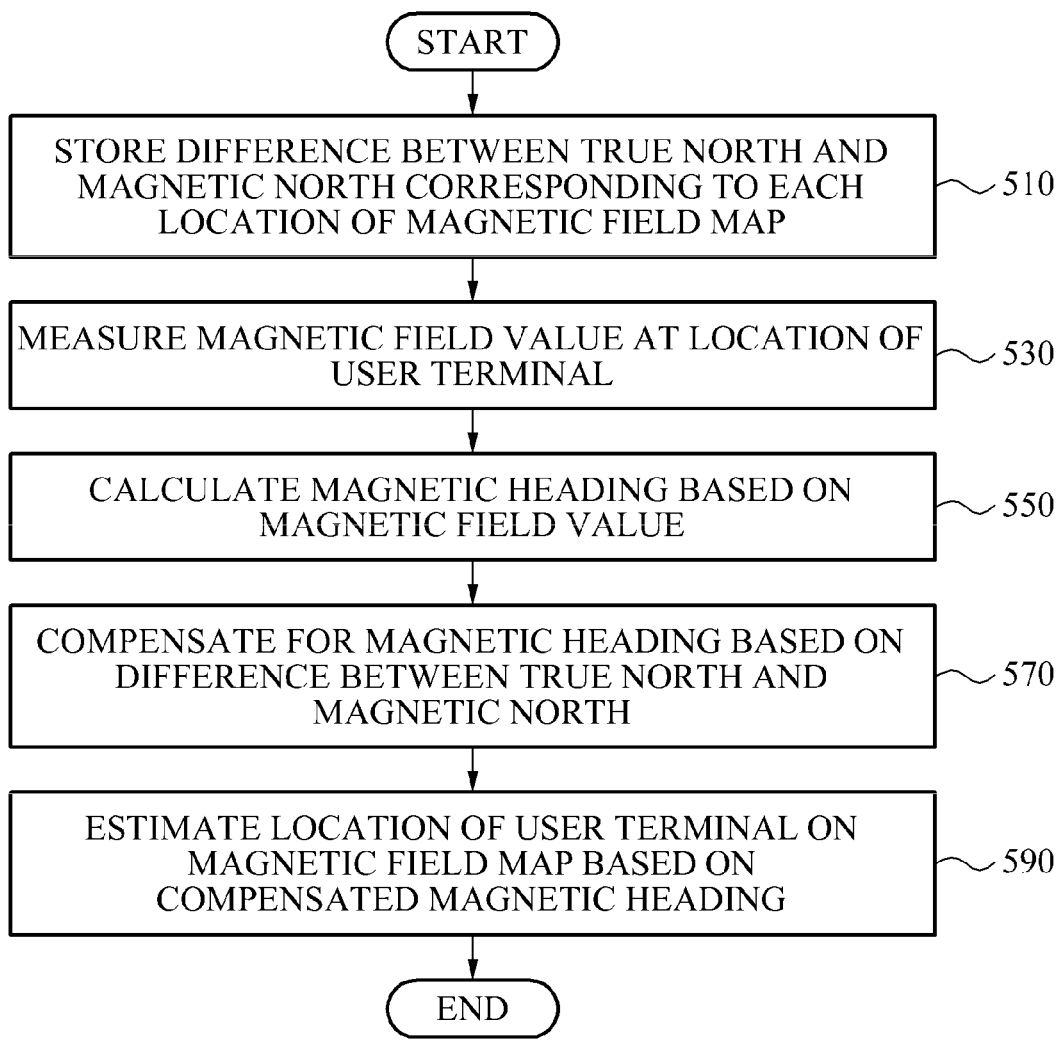
FIG. 5 is a flowchart illustrating a method of estimating a location of a user terminal according to another embodiment of the present disclosure.

FIG. 5 is a flowchart illustrating a method of estimating a location of a user terminal according to another embodiment of the present disclosure.

Referring to FIG. 5, in operation 510, the user terminal may store a difference between a true north and a magnetic north corresponding to each location of a magnetic field map.

In operation 530, the user terminal may measure a magnetic field value, for example, three axial values of a magnetic field at a location of the user terminal. Here, the user terminal may measure the magnetic field value at the location of the user terminal using, for example, a magnetometer and a magnetic field sensor.

In operation 550, the user terminal may calculate a magnetic heading based on the measured magnetic field value. Here, the magnetic heading may refer to a direction in which the user terminal moves based on the magnetic north, and may be measured based on a clockwise direction from the magnetic north.

In operation 570, the user terminal may compensate for the magnetic heading based on the difference between the true north and the magnetic north corresponding to each location of the magnetic field map. It will be further described with reference to FIGS. 6A and 6B.

In operation 590, the user terminal may estimate the location of the user terminal on the magnetic field map based on the compensated magnetic heading.

According to an embodiment, in operation 570, the user terminal may compensate for the magnetic heading based on the difference between the true north and the magnetic north corresponding to each of a plurality of particles of a particle filter. In operation 590, the user terminal may calculate a movement direction of each of the plurality of particles based on the compensated magnetic heading, and may estimate the location of the user terminal based on the calculated movement direction of each of the plurality of particles.

Also, the user terminal may estimate the location of the user terminal based on a weight assigned to the calculated movement direction of each of the plurality of particles. For example, the user terminal may estimate the location of the user terminal by changing a variance of Gaussian or a noise variation of Gyroscope configured to assign a weight to a movement direction of each of the plurality of particles of the particle filter.

Figure 6A:
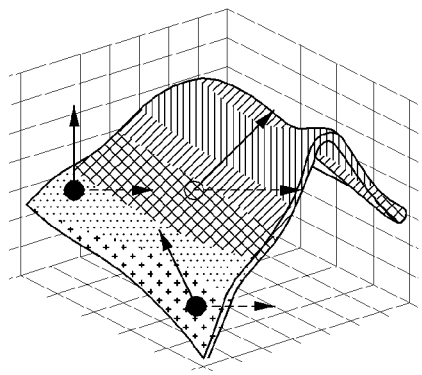
FIGS. 6A and 6B illustrate an example of a magnetic heading compensated for based on a difference between a true north and a magnetic north in a method of estimating a location of a user terminal according to various embodiments of the present disclosure.
Figure 6B:
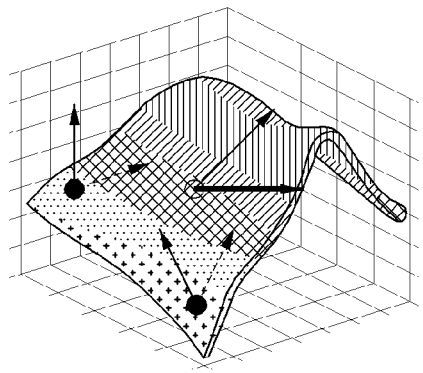

FIGS. 6A and 6B illustrate an example of a magnetic heading compensated for based on a difference between a true north and a magnetic north in a method of estimating a location of a user terminal according to various embodiments of the present disclosure.

A magnetic field map may be generated in a counter form and thus, a plurality of locations, for example, a plurality of candidate regions having the same magnetic field value may be present. Accordingly, the number of candidate regions may be decreased based on the difference between the true north and the magnetic field.

For example, referring to FIG. 6A, all of the magnetic headings point in a direction in which the user terminal moves based on the magnetic north collectively point towards the right side.

In this example, referring to FIG. 6B, in the case of compensating for a magnetic heading based on a difference between the true north and the magnetic north, a movement direction of the user terminal distorted by a terrestrial magnetism may be compensated for in a direction in which the user terminal substantially moves on a magnetic field map.

Figure 7:
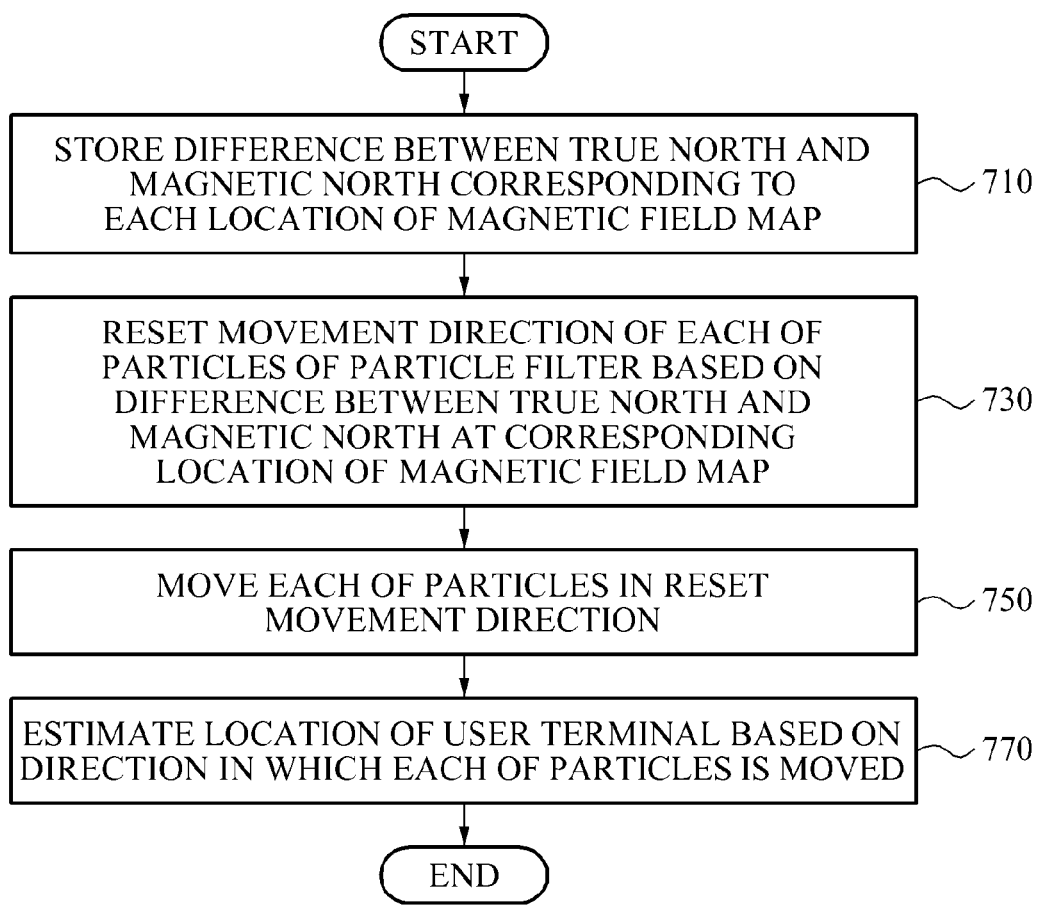
FIG. 7 is a flowchart illustrating a method of estimating a location of a user terminal according to still another embodiment of the present disclosure.

FIG. 7 is a flowchart illustrating a method of estimating a location of a user terminal according to still another embodiment of the present disclosure.

Referring to FIG. 7, in operation 710, the user terminal may store a difference between a true north and a magnetic north corresponding to each location of a magnetic field map.

In operation 730, the user terminal may reset a movement direction of each of a plurality of particles of a particle filter based on the difference between the true north and the magnetic north at a corresponding location of the magnetic field map.

In operation 750, the user terminal may move each of the plurality of particles in the reset movement direction. An example of the user terminal moving particles in an actual movement direction based on the difference between the true north and the magnetic north may refer to the description described above with reference to FIG. 4.

In operation 770, the user terminal may estimate the location of the user terminal based on a direction in which each of the plurality of particles is moved.

Figure 8:
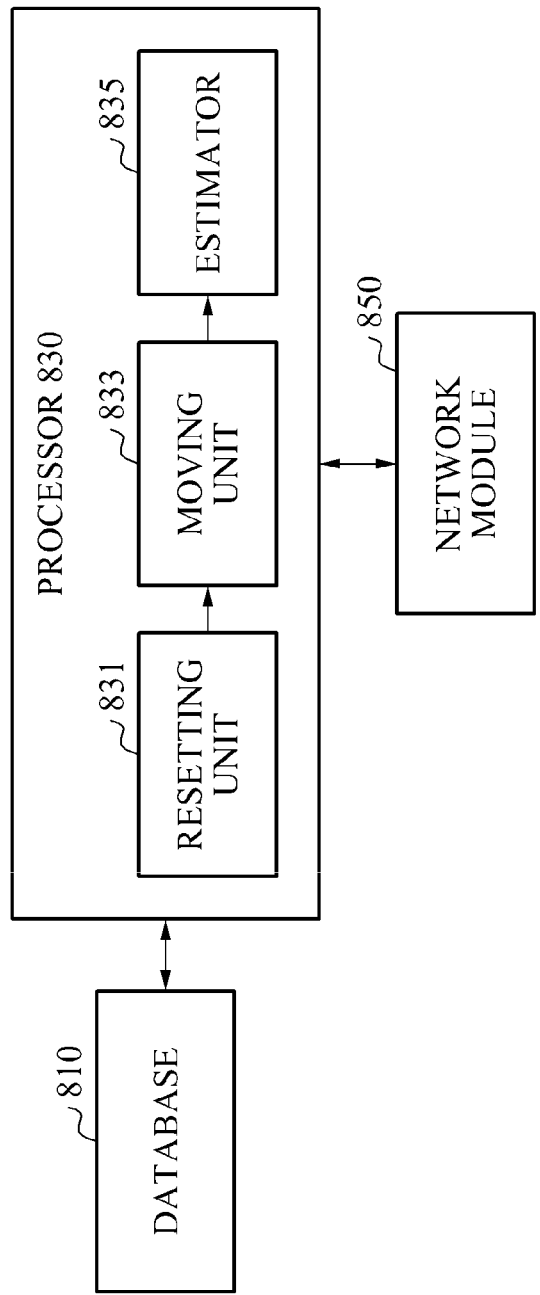
FIG. 8 is a block diagram illustrating a user terminal according to an embodiment of the present disclosure.

FIG. 8 is a block diagram illustrating a user terminal 800 according to an embodiment of the present disclosure.

Referring to FIG. 8, the user terminal 800 may include a database 810, a processor 830, and a network module 850.

The database 810 may store a difference between a true north and a magnetic north corresponding to each location of a magnetic field map.

The processor 830 may estimate the location of the user terminal on the magnetic field map based on the difference between the true north and the magnetic north.

The processor 830 may include a resetting unit 831, a moving unit 833, and an estimator 835.

The resetting unit 831 may reset a movement direction of each of a plurality of particles of a particle filter based on the difference between the true north and the magnetic north at a corresponding location of the magnetic field map. The moving unit 833 may move each of the plurality of particles in the reset movement direction. The estimator 835 may estimate the location of the user terminal based on a direction in which each of the plurality of particles is moved.

The network module 850 may receive the difference between the true north and the magnetic north corresponding to each location of the magnetic field map or may receive a difference between a true north and a magnetic north updated. Also, the network module 850 may inform an external server or other apparatuses of the location of the user terminal estimated by the processor 830.

Figure 9:
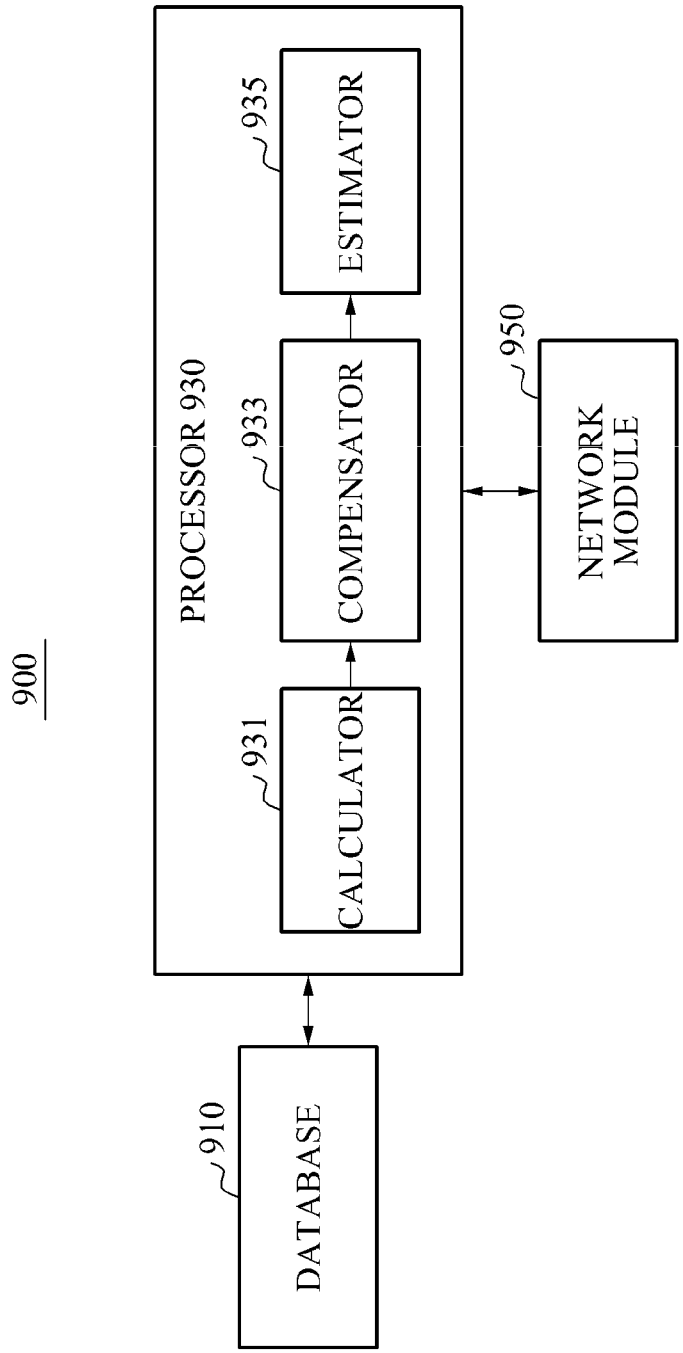
FIG. 9 is a block diagram illustrating a user terminal according to another embodiment of the present disclosure The same reference numerals are used to represent the same elements throughout the drawings.

FIG. 9 is a block diagram illustrating a user terminal 900 according to another embodiment of the present disclosure.

Referring to FIG. 9, the user terminal 900 may include a database 910, a processor 930, and a network module 950.

The database 910 may store a difference between a true north and a magnetic north corresponding to each location of a magnetic field map.

The processor 930 may estimate the location of the user terminal on the magnetic field map based on the difference between the true north and the magnetic north.

The processor 930 may include a calculator 931, a compensator 933, and an estimator 935.

The calculator 931 may calculate a magnetic heading pointing a direction in which the user terminal moves based on the magnetic north. The magnetic heading may be measured based on a clockwise direction from the magnetic north and may be referred to as a "compass direction".

The calculator 931 may measure a magnetic field value, for example, three axial values of an X axis, an Y axis, and a Z axis of the magnetic field, at the location of the user terminal, and may calculate the magnetic heading based on the measured magnetic field value.

The compensator 933 may compensate for the calculated magnetic heading based on the difference between the true north and the magnetic north corresponding to each location of the magnetic field map.

The compensator 933 may compensate for the magnetic heading based on the difference between the true north and the magnetic north corresponding to a location of each of a plurality of particles of a particle filter on the magnetic field map.

The estimator 935 may estimate the location of the user terminal on the magnetic field map based on the compensated magnetic heading.

The estimator 935 may calculate a movement direction of each of the plurality of particles based on the compensated magnetic heading, and may estimate the location of the user terminal based on the calculated movement direction of each of the plurality of particles.

Also, the estimator 935 may estimate the location of the user terminal based on a weight assigned to the calculated movement direction of each of the plurality of particles.

The network module 950 may receive the difference between the true north and the magnetic north corresponding to each location of the magnetic field map or may receive a difference between a true north and a magnetic north updated. Also, the network module 950 may inform an external server or other apparatuses of the location of the user terminal estimated by the processor 930.

The units described herein may be implemented using hardware components and software components. For example, the hardware components may include microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an Operating System (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described various embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as Read-Only Memory (ROM), Random Access Memory (RAM), flash memory, and the like. Examples of program instructions include all of machine code, such as produced by a compiler, and files containing higher level code that may be executed by the computer using an interpreter. The described hardware devices may be configured to act as one or more software modules in order to perform the operations of the above-described various embodiments, or vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for estimating a location of a user terminal, performed by the user terminal, the method comprising:
    measuring a magnetic field at a first location of the user terminal;
    calculating a magnetic north at the first location based on the magnetic field;
    determining a true north at the first location based on a magnetic field map and the magnetic north, the magnetic field map stored in the user terminal and including locations and differences in a true north and a magnetic north at each location;
    determining particles on the magnetic field map, the particles indicating candidate locations of the first location;
    estimating movement directions of the user terminal based on the measured magnetic field;
    obtaining differences between the true north and the magnetic north of each particle;
    adjusting the estimated movement directions at the locations of each particle based on the obtained differences;
    moving the particles along the adjusted movement directions; and
    estimating a second location of the user terminal on the magnetic field map based on locations of the moved particles.

2. The method of claim 1, wherein the estimating of the second location comprises:
    calculating a magnetic heading indicating a direction in which the user terminal is moving based on the magnetic north;
    adjusting the magnetic heading based on the difference between the true north and the magnetic north corresponding to each location of the magnetic field map; and
    after the adjusting of the magnetic heading, estimating the second location of the user terminal on the magnetic field map based on the magnetic heading.

3. The method of claim 2,
    wherein the measuring of the magnetic field comprises measuring a magnetic field value of the magnetic field using a magnetic sensor, and
    wherein the magnetic heading is calculated based on the magnetic field value.

4. The method of claim 2, wherein the adjusting of the magnetic heading comprises:
    adjusting the magnetic heading based on the difference between the true north and the magnetic north corresponding to a location for each particle of a particle filter on the magnetic field map.

5. The method of claim 4, wherein the estimating of the second location comprises:
    after the adjusting of the magnetic heading, calculating a movement direction for each particle based on the magnetic heading; and
    estimating the second location of the user terminal based on the movement direction for each particle.

6. The method of claim 5, wherein the estimating of the second location further comprises:
   estimating the second location of the user terminal based on a weight assigned to the movement direction for each particle.

7. A non-transitory computer-readable medium comprising a program for instructing a computer to perform the method of claim 1.

8. A user terminal estimating a location of the user terminal, the user terminal comprising:
   a magnetic sensor configured to measure a magnetic field at a first location of the user terminal;
   a memory configured to store a magnetic field map, the magnetic field map including locations and differences between a true north and a magnetic north at each location; and
   a processor configured to:
      calculate a magnetic north at the first location based on the magnetic field,
      determine a true north at the first location based on a magnetic field map and the magnetic north,
      determine particles on the magnetic field map, the particles indicating candidate locations of the first location,
      estimate movement directions of the user terminal based on the measured magnetic field,
      obtain differences between the true north and the magnetic north of each particle,
      adjust the estimated movement directions at the locations of each particle based on the obtained differences,
      move the particles along the adjusted movement directions, and
      estimate a second location of the user terminal on the magnetic field map based on locations of the moved particles.

9. The user terminal of claim 8, wherein the processor is further configured to:
   calculate a magnetic heading indicating a direction in which the user terminal is moving based on the magnetic north,
   adjust the magnetic heading based on the difference between the true north and the magnetic north corresponding to each location of the magnetic field map, and
   after the adjusting of the magnetic heading, estimate the second location of the user terminal on the magnetic field map based on the magnetic heading.

10. The user terminal of claim 9, wherein, when the processor calculates the magnetic heading, the processor is further configured to:
    measure a magnetic field value of the magnetic field, and
    calculate the magnetic heading based on the magnetic field value.

11. The user terminal of claim 9, wherein, when the processor adjusts the magnetic heading, the processor is further configured to adjust the magnetic heading based on the difference between the true north and the magnetic north corresponding to a location for each particle of a particle filter on the magnetic field map.

12. The user terminal of claim 11, wherein, when the processor estimates the second location of the user terminal, the processor is further configured to:
    after the adjusting of the magnetic heading, calculate a movement direction for each particle based on the magnetic heading, and
    estimate the second location of the user terminal based on the movement direction for each particle.

13. The user terminal of claim 12, wherein, when the processor estimates the second location of the user terminal, the processor is further configured to estimate the second location of the user terminal based on a weight assigned to the movement direction for each particle.

14. The user terminal of claim 9, wherein, when the processor estimates the second location of the user terminal, the processor is further configured to decrease a number of candidate regions in which the user terminal is located.

* * * * *